April 10, 1951     B. H. LOCKE     2,548,316

BELT TRACTION MEANS FOR V-PULLEYS

Filed Oct. 26, 1948

INVENTOR
Burton H. Locke

Patented Apr. 10, 1951

2,548,316

UNITED STATES PATENT OFFICE 2,548,316

BELT TRACTION MEANS FOR V-PULLEYS

Burton H. Locke, Framingham, Mass.

Application October 26, 1948, Serial No. 56,541

8 Claims. (Cl. 74—230.17)

My invention relates to improvements in V-belt traction means for V-pulleys of either the adjustable or non-adjustable type. However, the invention is especially useful in its adaption to adjustable V-pulleys, wherein the area of belt contact with the pulley becomes less as the effective diameter of the pulley is decreased, for reason to augment the belt traction with the pulley at the smaller diameters thereof. The invention can also be adapted with non-adjustable V-pulleys, and when so used the invention would be adapted to at least the smallest pulley of the V-belt drive for the reason to substantially bolster the normal traction of the belt with the smaller pulley to at least that of the larger pulley so that maximum transmission of power can be afforded by the drive.

The main object of the invention is to provide a simple and inexpensive means to augment the normal traction of a V-belt with a V-pulley over which the belt operates, whether the pulley is used as the drive or the driven pulley of a V-belt drive, in order to afford increased traction intermediate the belt and the pulley to permit the transmission of a substantial increase in the power normally limited to the traction of the belt with the pulley. Such added traction would permit the use of pulleys relatively smaller in size than used heretofore for transmitting a given power.

Heretofore, the amount of power that could be transmitted by a V-belt drive was confined to the traction obtainable from the sides of the belt contacting the pulley whether the pulley was of the adjustable type, which usually comprised a pair of movable opposed cone discs with the V-belt operating therebetween, or a non-adjustable V-pulley.

As is well known in the art, there are at least two types of V-belt drives in every day use, one being the type wherein a V-belt operates over a pair of V-grooved pulleys transmitting power from one to the other, and the other type being a drive wherein the V-belt operates over one V-grooved pulley while the other pulley is a flat faced pulley operating on the inside surface of the V-belt. It will be noted that my invention can be utilized to augment the belt traction with any of the V-belt pulleys used in any such drives.

In other words, this invention can be utilized to substantially increase the usual normal traction between a V-belt and a V-pulley regardless of the style of the V-pulley or the form of drive with which the V-pulley is associated.

Although my invention could be adapted to a V-pulley by the use of several conventional constructions, for reason of brevity, I will show the same only in one embodiment which is in connection with a conventional wide rubber V-belt operating on a so-called motor pulley drive, as this appears as best suited as any drive for my invention to be adapted to. However, I do not wish to be confined to this particular application, or to the construction shown.

Figure 1:
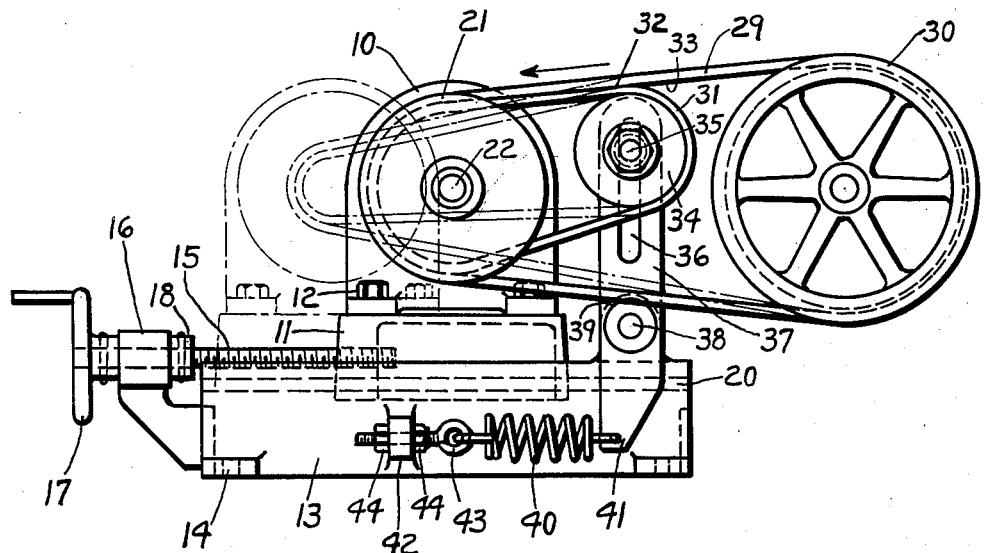
Figure 1 is a side elevation of a motor drive showing a means of adapting my invention thereto.
Figure 2:
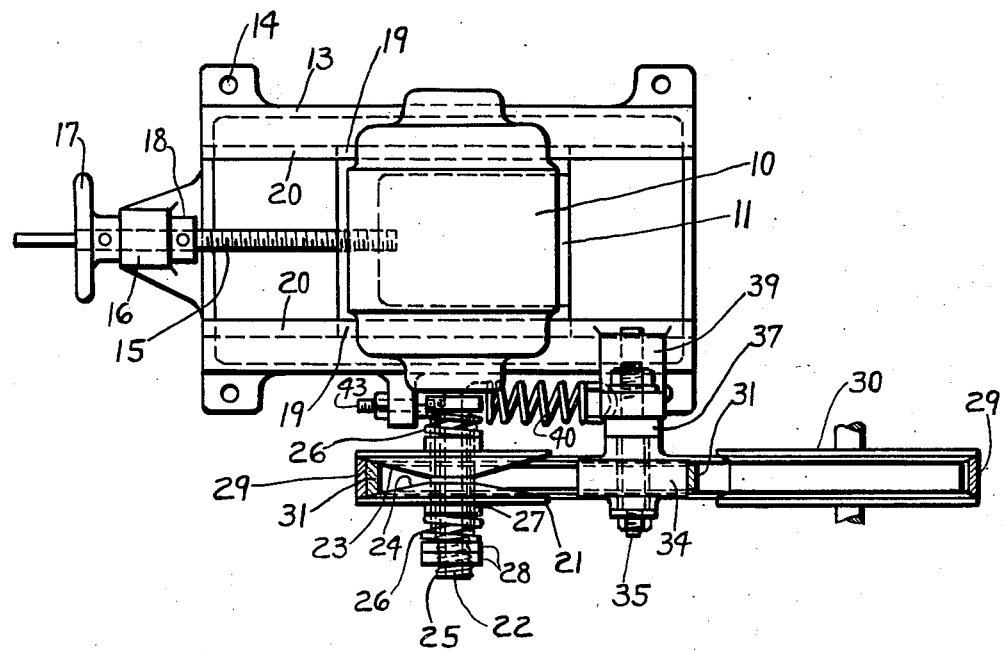
Figure 2 is a plan view of the same.

In the present showing my invention is associated with a constant speed motor 10 which is mounted on a base 11 by means of cap screws, or bolts 12, and arranged to impart variable motion to a machine or other mechanism. Base 11 is slidably mounted on a relatively larger base 13 which can be secured in any desired location, to facilitate a drive to a machine, by means of anchor bolts being extended through holes 14 provided in said base. There is a partially threaded rod or screw 15 rotatively mounted in a boss 16, provided on base 13, and is held axially therein by means of a handwheel 17 pinned to the screw and disposed to abut one side of the boss 16, and a collar 18, also pinned to the said screw, to abut the other side of the said boss. Screw 15 extends inward and has its threaded portion engaging the base 11. Base 11 is mounted to slide in base 13 through the medium of suitable projections 19 provided at each side of base 11 fitting into cooperative grooves 20 provided in base 13, all of which is obvious and standard practice in the art. It is obvious that any turning of handwheel 17 will cause base 11 to slide relative to base 13.

There is an adjustable V-pulley 21 mounted on motor shaft 22, which comprises two opposed cone discs 23 and 24 slidably mounted on a sleeve 25 which is secured to motor shaft 22. Cone discs 23 and 24 are resiliently pressed towards each other by means of compression springs 26 and are held to rotate with sleeve 25 by the conventional means of a plurality of keys or splines 27 provided in said sleeve. Proper operating condition of the springs 26 can be obtained by adjusting nuts 28, which have threaded engagement with sleeve 25.

A V-belt 29 is mounted to operate on cone discs 23 and 24 and on a pulley 30 mounted on a shaft (not shown) to be driven. Pulley 30 could be of the V-type to operate on the sides of the V-belt 29, as shown, or it could be a flat face pulley to operate on the inside surface of the said belt, both conditions of which are commonly used in the art.

The shifting of the position of motor 10 relative to pulley 30, by the manipulation of handwheel 17, causes the V-belt 29 to travel on a smaller or larger circuit of the cone discs 23 and 24 and thereby varies the speed of the V-belt 29 and thus the motion imparted to pulley 30 by the motor 10.

Constructions of adjustable pulleys other than that shown could be utilized, also other convention means of moving motor 10 relative to pulley 30 could be employed.

The mechanism just described comprises a convention motor drive unit, so-called, to which my invention can be adapted. However, I do not wish to be confined to this particular type of a V-belt drive as my invention can, obviously, be used in connection with any type of a V-belt drive.

It is obvious that the amount of power that can be transmitted by the V-belt 29 from adjustable pulley 21 to pulley 30 is dependent on the amount of traction intermediate the sides of the said V-belt and the pulley 21. Furthermore, when the motor is moved to adjust the drive to slow the motion of pulley 30, the length of circuit of the V-belt on the adjustable pulley 21 is reduced and thus the traction between the said V-belt and the pulley is reduced proportionally. I conceive to provide a simple means of augmenting the normal traction between the V-belt and the adjustable V-pulley 21 for the reason to permit the transmission of abnormal power by the V-belt drive. Obviously, any additional belt traction that can be effected intermediate the V-belt 29 and the adjustable V-pulley 21 would be instrumental in effecting a more powerful drive.

My improvement in belt traction means for V-pulley 21 comprises a relative short V-belt 31 of proper width to operate on cone discs 23 and 24 just in under the V-belt 29 so that the outer surface 32, of belt 31, contacts the inner surface 33, of belt 29, and effects traction therebetween. Obviously, it is not permissible that the width of V-belt 31 be such as to spread the said discs away from belt 29 so as to impair the normal traction of the sides of the V-belt 29 with the said discs.

An idler pulley 34, which in this instance has a flat periphery to contact the inside surface of V-belt 31, is provided to bring the free portion of belt 31 into contact with the inside surface of belt 29. Idler pulley 34 is rotatively mounted on a stud 35 which is movably secured in a slot 36 provided in an arm 37. Arm 37 is pivotally mounted on a stud 38 secured in a boss 39 provided on stationary base 13. An extension spring 40 is attached to the lower end 41, of arm 37, and is anchored to a boss 42, provided on base 13, by means of a hook-eye 43. Hook-eye 43 extends freely through boss 42 and has threaded engagement with nuts 44 positioned one on each side of said boss, respectively, for the purpose of affording adjustment of said eye 43 relative to said boss and thus afford a means to effect and retain proper operating tension on said spring.

The purpose of spring 40 is to retain idler pulley 34 in yieldable operating contact with V-belt 31 at all adjustments of the drive and thereby afford and retain proper operating tension on said belt at all times. It is obvious that the pulley centers for the V-belts 29 and 31 will vary, relatively, as the motor is moved in varying the motion, for reason that the centers of the three pulleys are not in alignment. Therefore, spring 40 will also serve to automatically swing arm 37 to position idler pulley 34 to compensate for this relative change in center distance and thereby retain the V-belt 31 under proper operating tension in respect to V-belt 29 and in proper operating contact therewith as the V-belts are forced down between the discs 23 and 24 by the movement of the motor 10.

Stud 35 is adapted to be moved in slot 36, of arm 37, to position idler pulley 34 properly to cause the outer surface 32, of V-belt 31, to properly contact the inside surface 33, of V-belt 29, to effect traction therebetween substantially all along the said surfaces thereof, between the idler pulley 34 and the adjustable pulley 21, for reason to afford substantial traction between the belts. Idler pulley 34 is positioned as shown when the drive is operated in the direction of the arrow, or counterclockwise in reference to Figure 1. When the drive is arranged to operate in the reverse, or clockwise direction, idler pulley 34 is moved near the lower end of the slot 36 to bring the V-belt 31 in contact with the lower inside surface of V-belt 29. It will be noted that the object in each case is to position V-belt 31 to contact the "pull" side of V-belt 29 so that the pull created on V-belt 31 by its traction with the drive pulley 21 will effect a pulling traction with V-belt 29 and thereby assist the said driving pulley 21 to drive the V-belt 29 to transmit power to the driven pulley 30.

In other words, a pull is imposed on V-belt 31 through its contact with drive pulley 21 and such pull is transmitted to V-belt 29 through the traction effected by the contact of the two belts, and inasmuch as the outer surface 32, of belt 31, travels at the same speed as the inner surface 33, of belt 29, such pull, or power, will be transmitted from one belt to the other without any slippage therebetween due to varying speeds. Thus wearing of the belts through slippage causeable by one belt traveling at a different speed than the other is avoided.

The motor and driving pulley and the V-belts are shown by broken lines when the drive is adjusted to deliver minimum motion to driven pulley 30. It will be noted that in this position the driving V-belt 29 is drawn taut over V-belt 31 at the idler pulley 34 which will effect increased pressure between the belts 31 and 29 and thereby afford increased traction therebetween at this position. This increased pressure between the belts is especially helpful at the lower belt speeds, where it is effected, for reason to increase the overall horsepower rating of the drive.

It is apparent that my invention could be adapted to a non-adjustable V-pulley providing the V-groove in the pulley is constructed of suitable depth to receive the relative short V-belt 31 below the main drive belt 29.

As stated hereinbefore, I have shown my invention in connection with a solid wide V-belt, such as is usually constructed of rubber, or the like. However, the same could be utilized with standard commercial narrow width V-belts, if desired, and in connection with so-called multiple belt drives wherein a plurality of equal length driving belts operate over multiple groove V-pulleys. Obviously this latter application would require suitable V-belts 31 that would operatively contact each driving V-belt properly, as well as to operate properly in the respective groove of the driving pulley. Furthermore, the invention could be utilized with the so-called wide cog V-belts, such as made by Reeves Pulley Co., for example, and serve substantially as effective therewith.

As indicated herein, I do not wish to be confined to the exact details, or constructions, or application, set forth as I feel the invention is susceptible of use with many types of V-belts and V-belt drives, and with several arrangements of idler pulleys to position and retain the short traction V-belt in contact with the driving V-belt.

I claim:

1. Belt traction means for V-pulleys comprising in combination, a pair of V-pulleys mounted for rotation, a V-belt operatively connecting the pulleys by means of the sides of the belt contacting the pulleys, a relatively shorter V-belt operating on one of the pulleys, the last said belt contacting the inside surface of the first said belt and the sides of the respective pulley and thereby effecting traction therebetween.

2. Belt traction means for V-pulleys as described in claim 1, with means to effect tension on the said shorter V-belt to effect proper operating condition thereof.

3. Belt traction means for a pair of pulleys comprising in combination, a V-belt operatingly connecting the pulleys, one of the pulleys having a V-groove contacting the sides of the said V-belt, a relatively shorter V-belt operating on the V-grooved pulley by contacting the sides of the said groove and the inside surface of the first said V-belt and thereby effecting traction therebetween.

4. Belt traction means for a pair of pulleys as described in claim 3, with means to effect tension on the said shorter V-belt to effect proper operating condition thereof.

5. Belt traction means for a pair of opposed cone-faced discs resiliently pressed toward each other comprising in combination, a V-belt operating between the said discs with the sides of the belt contacting the discs, a relatively shorter V-belt operating between the discs and within the first said belt by contacting the face of the discs and the inside surface of the the first said V-belt and thereby effecting traction therebetween.

6. Belt traction means for a pair of opposed cone-faced discs as described in claim 5, with means to effect tension on the said shorter V-belt to effect proper operating condition thereof.

7. Belt traction means for V-pulleys comprising in combination, a pair of pulleys mounted for rotation, one of the pulleys comprising a pair of opposed cone-faced discs resiliently pressed toward each other, a V-belt operating on the said pulleys with the sides of the belt contacting the face of the discs, a relatively shorter V-belt operating between the said discs and inside of the first said belt by contacting the face of the discs and the inside surface of the first said V-belt and thereby effecting traction therebetween.

8. Belt traction means for V-pulleys as described in claim 7, with means to effect tension on the said shorter V-belt to effect proper operating condition thereof.

BURTON H. LOCKE.

REFERENCES CITED

The following references are of record in the file of this patent:

UNITED STATES PATENTS

| Number | Name | Date |
| --- | --- | --- |
| 899,648 | Baker | Sept. 29, 1908 |
| 1,857,324 | Okumara | May 10, 1932 |
| 2,170,212 | Pfleger | Aug. 22, 1939 |
| 2,283,392 | Shadrick | May 19, 1942 |

FOREIGN PATENTS

| Number | Country | Date |
| --- | --- | --- |
| 243,184 | Great Britain | Nov. 26, 1925 |